July 8, 1958   M. H. BUTLER   2,841,914
FISH HOOKS
Filed Sept. 19, 1956
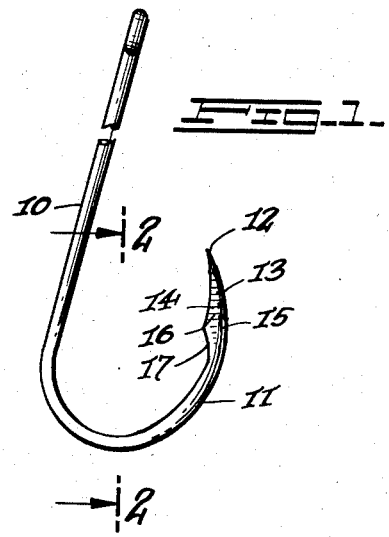
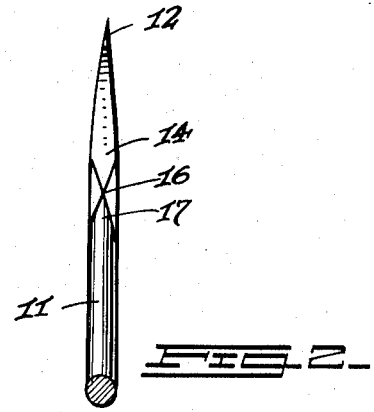
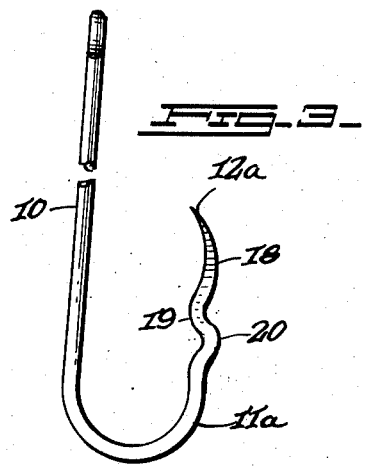
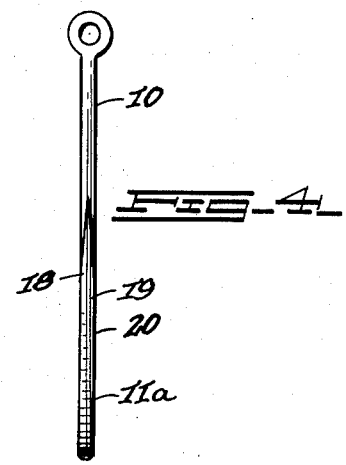
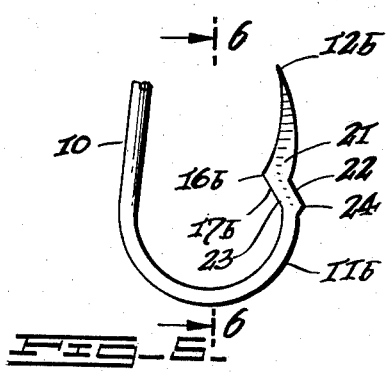
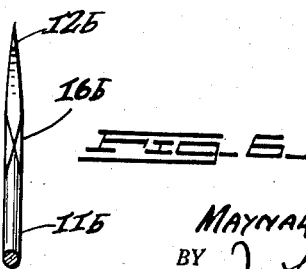
INVENTOR.
MAYNARD H. BUTLER.
BY J. Ledermann
ATTORNEY.

United States Patent Office 2,841,914
Patented July 8, 1958

2,841,914

FISH HOOKS

Maynard H. Butler, Smithtown, N. Y.

Application September 19, 1956, Serial No. 610,789

1 Claim. (Cl. 43—43.16)

This invention relates to barbless fish hooks, and the main object is the provision of certain new and useful improvements in fish hook construction, whereby undersized fish which have been hooked and caught may be removed from the hook without injury, to be returned to the water. This is, obviously, a most desirable feature for conservation purposes, as fish which have been removed from an ordinary barbed hook are often seriously injured so that they fail to survive upon return to the water.

The above broad as well as additional and more specific objects will be clarified in the following description wherein reference numerals refer to like-numbered parts in the accompanying drawing. It is to be noted that the drawing is intended solely for the purpose of illustration and that it is therefore neither desired nor intended that the invention be limited to the exact details of construction shown except insofar as they may be deemed essential to the invention.

Referring briefly to the drawing,

Fig. 1 is a side elevational view of a fish hook whose pointed return arm illustrates one form of the present invention.

Fig. 2 is a sectional view taken on the line 2—2 of Fig. 1.

Fig. 3 is a side elevational view of a fish hook illustrating another form of pointed return arm.

Fig. 4 is a front elevational view of the hook shown in Fig. 3.

Fig. 5 is a fragmentary side elevational view of a fish hook illustrating still another form of pointed return arm.

Fig. 6 is a sectional view taken on the line 6—6 of Fig. 5.

Referring in detail to the drawing, the shanks of the various forms of the fish hooks illustrated, are indicated by the numeral 10. Although these shanks are shown shaped into a ring 11 at the top, it is of course to be understood that this feature is presented only for the purpose of illustration and that the invention applies to all and any forms or types of shank regardless of what means is used or applied to the shank for the purpose of attaching the hook to a line.

In the form of hook shown in Figs. 1 and 2, the return arm 11 is provided with a point 12 adapted to penetrate the fish. The tip of the arm from the point 12 downward, has a convex outer conformation 13 and a concave inner conformation 14, so that the tip gradually widens in a downward direction and reaches a maximum width at the base portion 15 of the tip, the width or thickness of this portion being larger than that of the shank and the lower portion of the arm 11, to provide a projection 16 toward the shank. The projection 16 constitutes a point or transverse ridge 16 of very small length, defined by the intersection of the concave surface 14 and a concave surface 17 blending below the point 16 with the arm 11. The angle formed by the intersection of these surfaces is quite obtuse, whereas that constituting the point 12 is very acute, as is apparent in Figs. 1 and 2. Also, the length of the tip above the base 15 or point 16 is substantially greater than the length of the surface 17.

When a fish has taken this hook, the tip easily enters the fish and passes thereinto until the base 15 has passed through the lip, for example, of the fish, so that the bulge of the base 15 serves to keep the fish on the hook. This construction, however, enables removal of the fish without damage or injury, as is obvious, so that it may be returned to the water intact in case it is undersized.

In the form of hook shown in Figs. 3 and 4, the base of the tip of the hook is shown at 18, with the tip merely tapering gradually to the point 12a. Below the tip the arm 11a is provided with a rearward curve 19 followed by a forward curve 20, the two curves together constituting a bend of the form of a wave of one cycle lying substantially in the plane of the hook. In this form of hook, a hooked fish will be constrained to the hook between the base of the arm 11a and the bend 20, or both bends 20 and 19, and the fish may also be easily removed from the hook without injury.

Referring to Figs. 5 and 6, the tip of the hook arm 11b between the point 12b and the base 21 of the tip, has substantially the same appearance as the tip of the arm 11 in Figs. 1 and 2. However, the surface 17b extending downward on the left-hand side from the base projection or point 16b, is straight instead of concave, and the right-hand side 22 of the arm extending downward from the base 21 is also straight and parallel to the side 17a, thus providing a section 23 between the base 21 and the arm 11b extending downward at an angle with respect to the tip above the base 21, and in a direction outward from the shank. Further, at the lower end of the section 23 the arm has an enlargement or projection outward shaped into a point 24. In this form of hook, the hooked fish is secure on the hook between the projection 24 and the base of the arm 11b, and it may readily be removed without injury.

It is thus apparent that an improved construction for fish hooks has been provided, which is efficient in hooking fish and which at the same time permits of easy removal of the fish without injury.

I claim:

A barbless fish hook including a shank and a return arm, said arm having a pointed tip tapering to the extremity thereof, that one side of the tip nearer the shank being concave, the opposite side of the tip being convex, the intermediate portion of said arm below the tip having the shape of a complete single cycle of a wave lying in the plane of the hook thereby providing a rounded bulge on said one side of the arm and vertically spaced therebelow a second rounded bulge on said oposite side of the arm, the lower portion of said arm and the lower end of said intermediate portion being curved at their junction, the curvature of said junction consisting of a concave side facing the shank and a convex side facing oppositely thereto, said arm throughout the length thereof being cylindrical in cross-section whence the surface thereof is smooth and continuous.

References Cited in the file of this patent

UNITED STATES PATENTS

| 627,179 | Dreese | June 20, 1899 |
| 779,843 | Fredricks | Jan. 10, 1905 |
| 1,430,626 | Christensen | Oct. 3, 1922 |
| 1,502,781 | Jamison | July 29, 1924 |
| 1,513,400 | Koski | Oct. 28, 1924 |